United States Patent [19]

Staniforth

[11] Patent Number: 5,188,401
[45] Date of Patent: Feb. 23, 1993

[54] PIPE COUPLING WITH INTERLOCKED AND SEGMENTED GRIP RING

[75] Inventor: Graeme Staniforth, Skelmersdale, United Kingdom

[73] Assignee: WASK-RMF Ltd., England

[21] Appl. No.: 688,560

[22] PCT Filed: Dec. 20, 1989

[86] PCT No.: PCT/GB89/01514

§ 371 Date: Aug. 15, 1991

§ 102(e) Date: Aug. 15, 1991

[87] PCT Pub. No.: WO90/07671

PCT Pub. Date: Jul. 12, 1990

[30] Foreign Application Priority Data

Dec. 23, 1988 [GB] United Kingdom ............ 8830202

[51] Int. Cl.⁵ ........................................ F16L 47/00
[52] U.S. Cl. ............................ 285/322; 285/249; 285/341; 285/330
[58] Field of Search ........... 285/328, 337, 249, 411, 285/248, 341, 342, 343, 232, 330, 913, 323, 243, 339

[56] References Cited

U.S. PATENT DOCUMENTS

| | | | |
|---|---|---|---|
| 1,788,366 | 1/1931 | Anderson | 285/343 X |
| 3,158,388 | 11/1964 | Marshall | 285/341 X |
| 3,189,962 | 6/1965 | Hartwell | 285/341 X |
| 3,679,239 | 7/1972 | Schmitt | 285/249 X |
| 3,744,824 | 7/1973 | Roos | 285/317 |
| 3,870,349 | 3/1975 | Oetiker | 285/249 |
| 4,062,572 | 12/1977 | Davis | 285/349 X |
| 4,798,404 | 1/1989 | Iyanicki | 285/249 X |

FOREIGN PATENT DOCUMENTS

| | | |
|---|---|---|
| 241656 | 10/1987 | European Pat. Off. ........... 285/249 |
| 0455490 | 6/1991 | European Pat. Off. . |
| 2525727 | 10/1983 | France . |
| 611051 | 10/1948 | United Kingdom . |
| 760290 | 10/1956 | United Kingdom . |
| 944590 | 6/1965 | United Kingdom . |
| 1535090 | 6/1978 | United Kingdom . |
| 2002079 | 2/1979 | United Kingdom . |
| 1568669 | 4/1980 | United Kingdom . |
| 2044378A | 10/1980 | United Kingdom . |
| 1591743 | 6/1981 | United Kingdom . |
| 2167145 | 5/1986 | United Kingdom . |

Primary Examiner—Eric K. Nicholson
Attorney, Agent, or Firm—Pravel, Gambrell, Hewitt, Kimball & Krieger

[57] ABSTRACT

A pipe coupling for connecting a pipe (6) to a fitting (5). The coupling comprises an annular assembly (1) incorporating a gripping ring (4) for inserting into a radial gap between the pipe (6) and the fitting (5), and structure (8,9) for applying an axial load to the annular assembly (1) so that the gripping ring (4) is biased radially against the pipe (6). The gripping ring (4) is defined by a plurality of separable segments dimensional such that when the annular assembly (1) is axially compressed each of the segments is biased against the pipe (6).

10 Claims, 5 Drawing Sheets

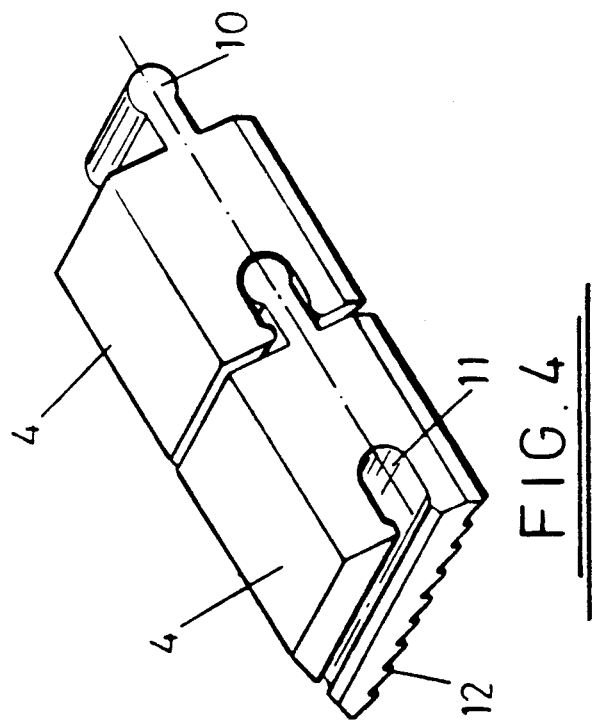
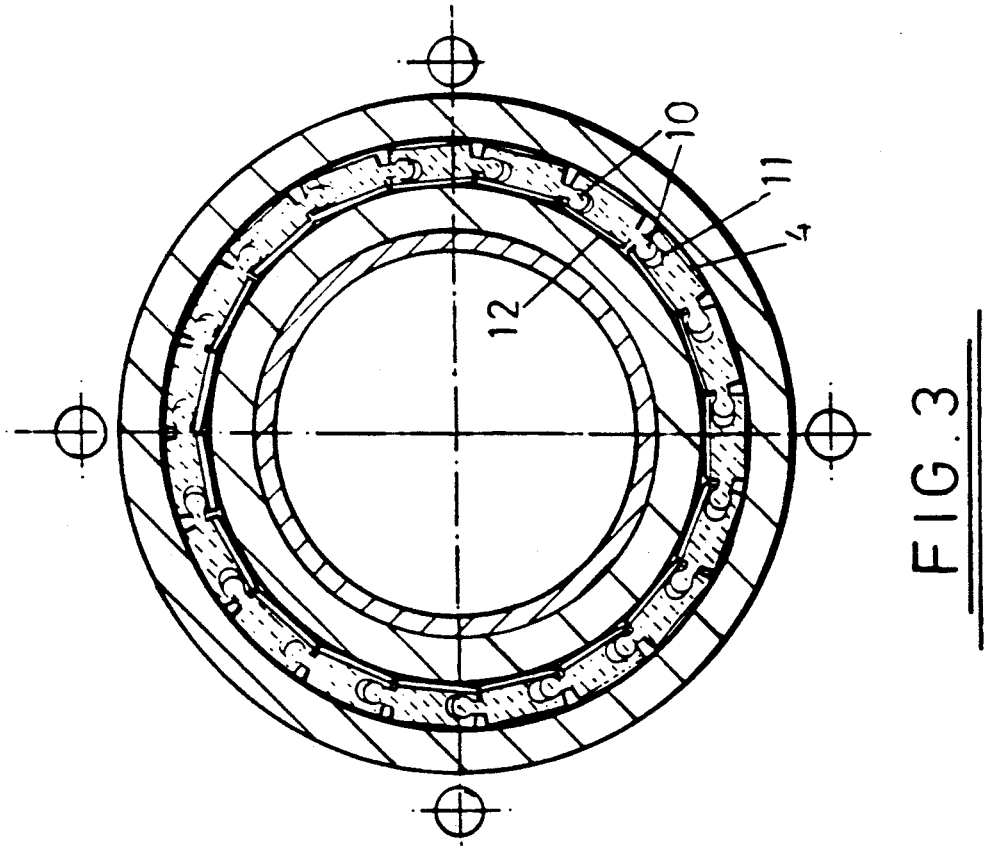

PIPE COUPLING WITH INTERLOCKED AND SEGMENTED GRIP RING

FIELD OF INVENTION

The present invention relates to a pipe coupling for connecting a pipe to a fitting.

DESCRIPTION OF THE PRIOR ART

Many different pipe couplings have been proposed in the past for connecting pipes to fittings. The pipes are generally circular in cross-section and the fittings may be of a variety of forms, for example fittings to interconnect two pipes end to end, fittings to connect a pipe to devices such as valve housings, and fitting to form elbows, T-junctions or the like. The present invention is applicable to any situations in which one end of a pipe has to be connected to any other component.

It is highly desirable to be able to make secure connections to plain ended pipes, that is pipes the ends of which do not support formations such as flanges against which the coupling can bear to provide pull-out resistance. Such pipes are often used to convey potentially hazardous fluids such as flammable pressurised gases or liquids. If the couplings at each end of the pipe do not positively grip the pipe ends there is risk that the pipe ends will be pulled from the fittings.

Couplings have been devised which incorporate a sealing ring that not only provides a good fluid-type seal between the fitting and the pipe but also grip the pipe end to provide enhanced pull-out resistance. One example of such a sealing ring is described in British Patent Specification GB 2167145. In this patent specification a sealing ring is described which is fabricated from a resilient material in which gripping members are embedded. When the coupling is assembled the sealing ring is compressed in such a manner that the gripping members are biased radially inwards against the outer wall of the pipe. As the coupling is tightened up the gripping members bite into the pipe wall and provide good pull-out resistance. The manufacture of such sealing rings incorporating embedded gripping members is however a relatively complex procedure and as a result the couplings are relatively expensive. This is of particular importance where a full range of couplings must be provided to enable the user to select from the range couplings appropriate to a variety of different pipe diameters. Economies of scale are therefore difficult to achieve.

It is an object of the present invention to provide a pipe coupling which obviates or mitigates the problems outlined above.

SUMMARY OF INVENTION

According to the present invention there is provided a pipe coupling for connecting a pipe to a fitting, the coupling comprising an annular assembly incorporating a gripping ring for insertion into a radial gap between the pipe and the fitting, and means for applying an axial load to the annular assembly so that the gripping ring is biased radially against the pipe, wherein the gripping ring is defined by a plurality of separable segments, characterized in that adjacent segments of the gripping ring are directly interlocked, and at least a plurality of the segments are gripping segments which are dimensioned such that when the annular assembly is axially compressed the gripping segments are biased against the pipes.

To achieve interlocking, adjacent segments in the gripping ring may be interlocked by loose dovetail interengaging formations. Each segment may be a gripping segment, or alternatively a plurality of spacer segments may be provided, adjacent gripping segments in the gripping ring being interconnected by spacer segments with which the gripping segments are interlocked.

Preferably, the annular assembly comprises a resilient sealing ring. A force transmitting ring is preferably interposed between the gripping ring and the sealing ring. The force transmitting ring and the sealing ring could be incorporated together so that only one component part would be required in the annular assembly to perform both sealing and force transmission functions.

The fitting may define a housing into which one end of the pipe is inserted, the annular assembly extending around the pipe inside the housing. In such an arrangement, the fitting may comprise an annular housing having a first end which is in sliding engagement with the socket and a second end defining a shoulder extending radially inwards and facing towards the first end, the sealing ring being received within the first end of the housing, the gripping ring being located between the sealing ring and the shoulder, and the axial load applying means comprising means for forcing the shoulder of the annular housing towards the socket so as to compress the annular assembly between the socket and the said shoulder.

Alternatively, the fitting may comprise a tubular body one end of which is inserted in the end of the pipe, the annular assembly extending around the tubular body inside the pipe. The tubular body may have a radially outwardly extending shoulder adjacent its said end, and the axial load applying means may comprise means connected to the tubular body for pushing the annular assembly against the said shoulder.

BRIEF DESCRIPTION OF THE DRAWINGS

Embodiments of the present invention will now be described, by way of example, with reference to the accompanying drawings, in which:

FIG. 3 is a section on the line III—III of FIG. 1;

FIG. 4 is a perspective view of two gripping ring segments of the type illustrated in FIGS. 1 to 3;

DESCRIPTION OF PREFERRED EMBODIMENT

Figure 1:
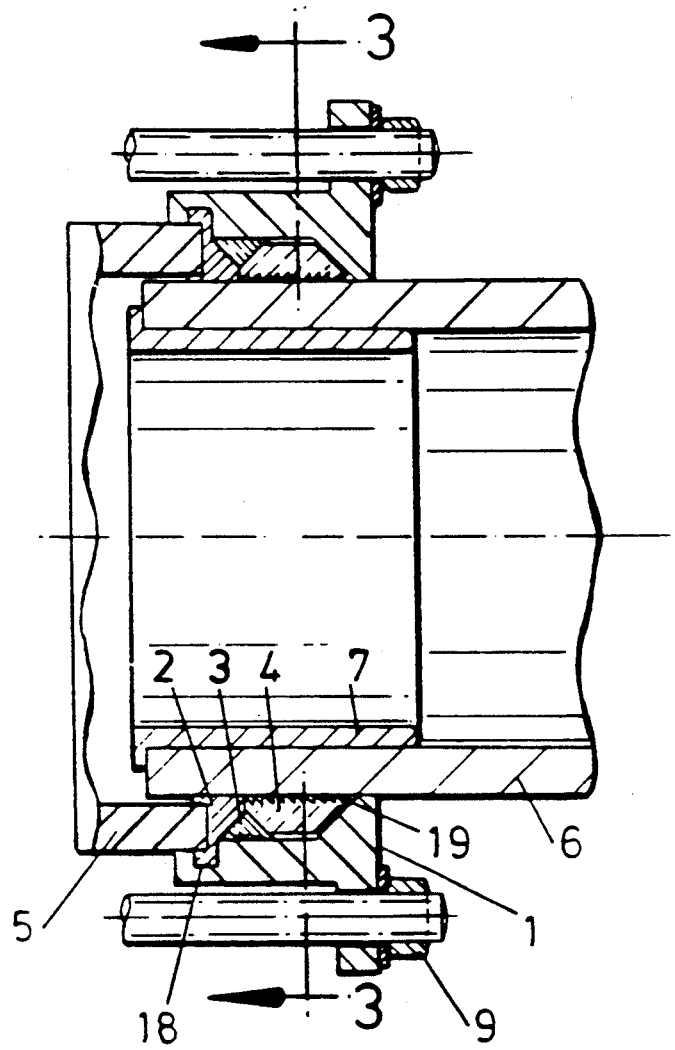
FIG. 1 is a sectional view through a coupling embodying the present invention.

Referring to the accompanying drawings, the coupling comprises an annular housing 1 in which is received an annular assembly incorporating a resilient sealing ring 2, a metal ring 3, and a gripping ring made up from a plurality of individual segments 4. The annular housing 1 engages a tubular socket 5, the housing 1 and socket 5 defining a fitting to which a pipe 6 is to be connected. The fitting of which the socket 5 forms a part may be of any type and could be for example a straight connector for interconnecting two pipes end to end, in which case the components illustrated in FIG. 1 are duplicated at either end of the socket 5. In the illustrated case the pipe 6 is of polyethylene and accordingly a metal insert 7 is provided in the pipe end to prevent the pipe end from collapsing radially inwards. Tension bolts 8 extend through the annular housing 1 such that when nuts 9 are tightened the annular assembly is pulled against the socket 5. The end of the annular housing 1 adjacent the socket 5 is a loose sliding fit over the socket 5.

Figure 2:
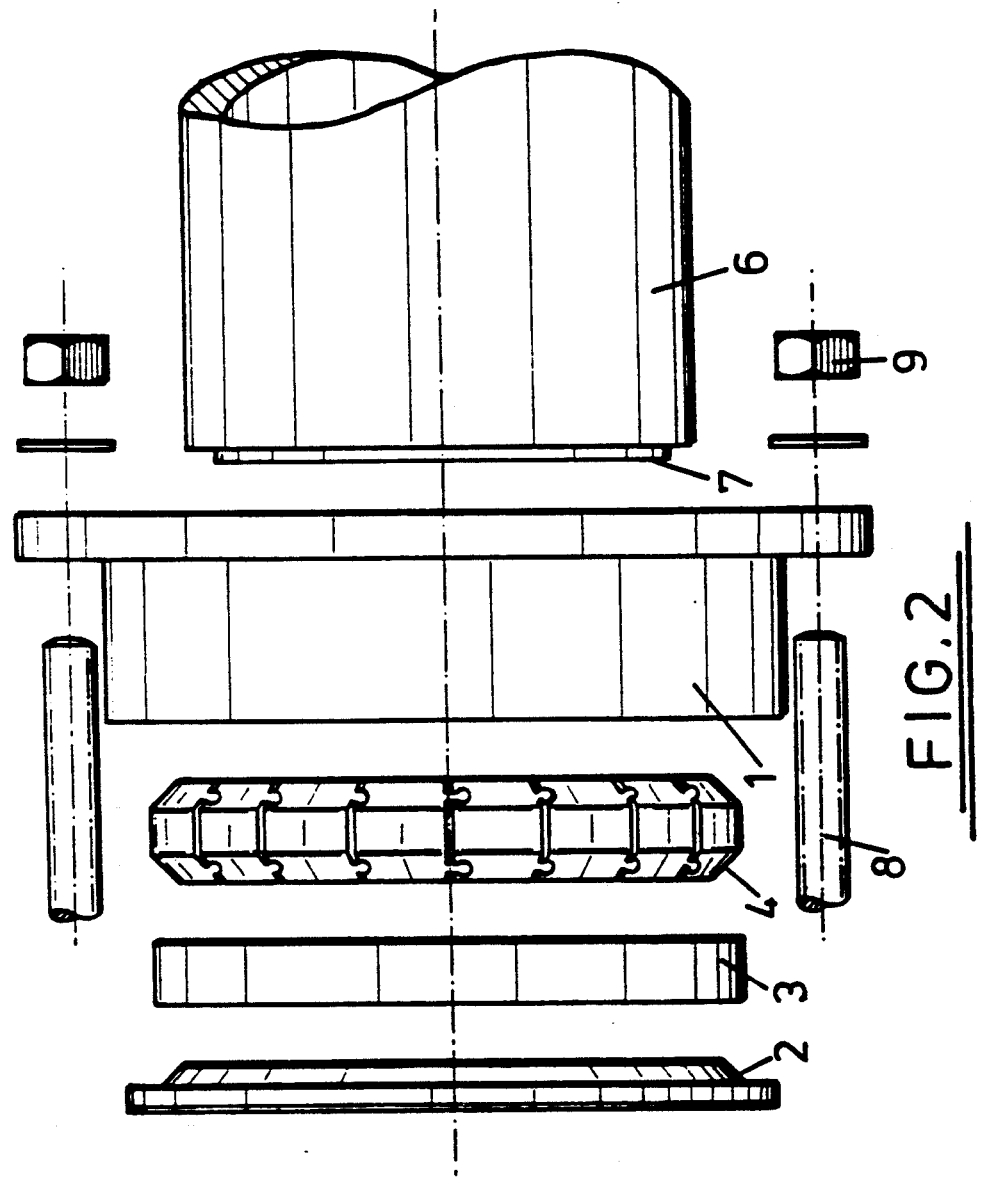
FIG. 2 is a side elevation of the components making up the coupling illustrated in FIG. 1.

FIG. 2 is an exploded view of the components shown in FIG. 1 and FIG. 3 is a section through FIG. 1 on the line III—III. FIG. 4 illustrates two of the gripping segments 4 and it can be seen that each of the gripping segments is identical and incorporates a tongue 10 with an enlarged end and a keyhole-section socket 11 into which the tongue 10 of an adjacent segment can be lipped in the axial direction. This is one example of a "dovetail" type interengagement between segments. Thus each of the segments can move relative to its two neighbours in both the axial and circumferential directions. It can also be seen from FIGS. 1 and 4 that the side of each segment facing the pipe 6 is provided with serrations 12.

Figure 5:
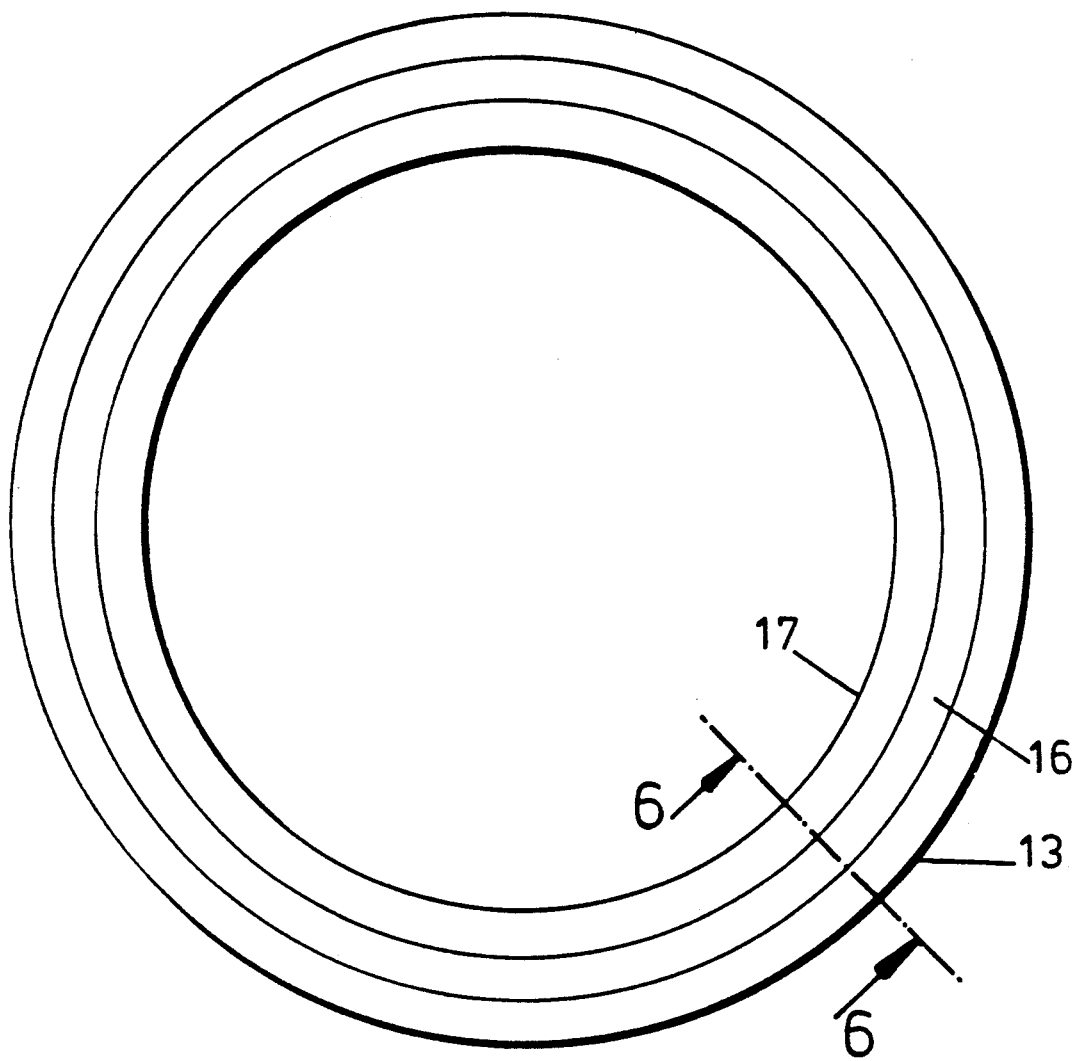
FIG. 5 is a front view of a sealing ring of the type incorporated in the embodiment of FIG. 1 before distortion of its shape as a result of compression forces.
Figure 6:
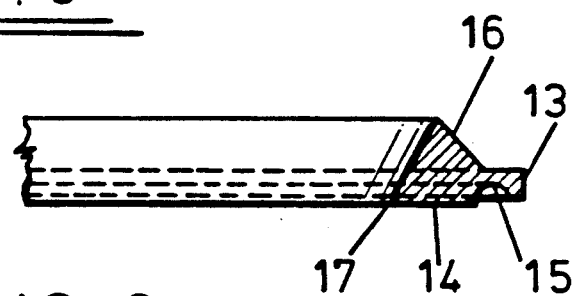
FIG. 6 is a radial section through the sealing ring of FIG. 5 on the VI—VI.

Referring to FIGS. 5 and 6, the sealing ring 2 in its free state defines a peripheral lip 13 extending radially outwards from a main body 14 which is of generally triangular cross-section. A groove 15 reduces the pressure required to cause some axial displacement between the lip 13 and the body 14. An inclined surface 16 is in use positioned adjacent the ring 3. An inner lip 17 has a diameter less than that of the minimum expected diameter of the pipe 7 onto which the assembly is to be fitted.

When the coupling is to be assembled, the assembly comprising the housing 1, the sealing ring 2, the ring 3 and the gripping segments 4 is simply slipped over the pipe end. As the segments 4 are only loosely retained within the housing they easily ride up over the end of the pipe and are prevented from being pushed out of the assembly by the engagement between the sealing ring lip 13 and the mating groove 18 in the housing 1. The sealing ring is initially distorted as a result of the internal diameter of the sealing ring being less than that of the pipe. The pipe end is then inserted into the socket 5, the bolts 8 are inserted and the nuts 9 are tightened up. This pulls the annular assembly onto the socket 5. An axial compression force is applied by the shoulder 19 to the segments 4 and this axial compression force is transmitted through the ring 34 to the sealing ring 2. The sealing ring 3 is compressed against the socket 5 and as a result the sealing ring 3 fills the space between the socket 4, the pipe 6 and the housing 1. Thus a good fluid tight seal is defined between the socket 5 and the pipe. The axial compression force also causes a radial compression force to be applied to the segments 4 as a result of the tapering surfaces of the ring 3 and the shoulder 19 and the tapering adjacent surfaces of the segments 4. The serrations 12 of the segments are thus forced radially inwards to engage the pipe 6. If tension is subsequently applied to the pipe 6 it is prevented from pulling out of the socket 5 by this engagement between the segments 4 and the pipe.

As the gripping ring is in the form of a series of segments 4 and can easily be pulled over even a distorted pipe of oval cross-section. The resistance to forces tending to pull the pipe away from the fitting is very large, typically grater than that required to result in failure of a polyethylene pipe for example.

Figure 7:
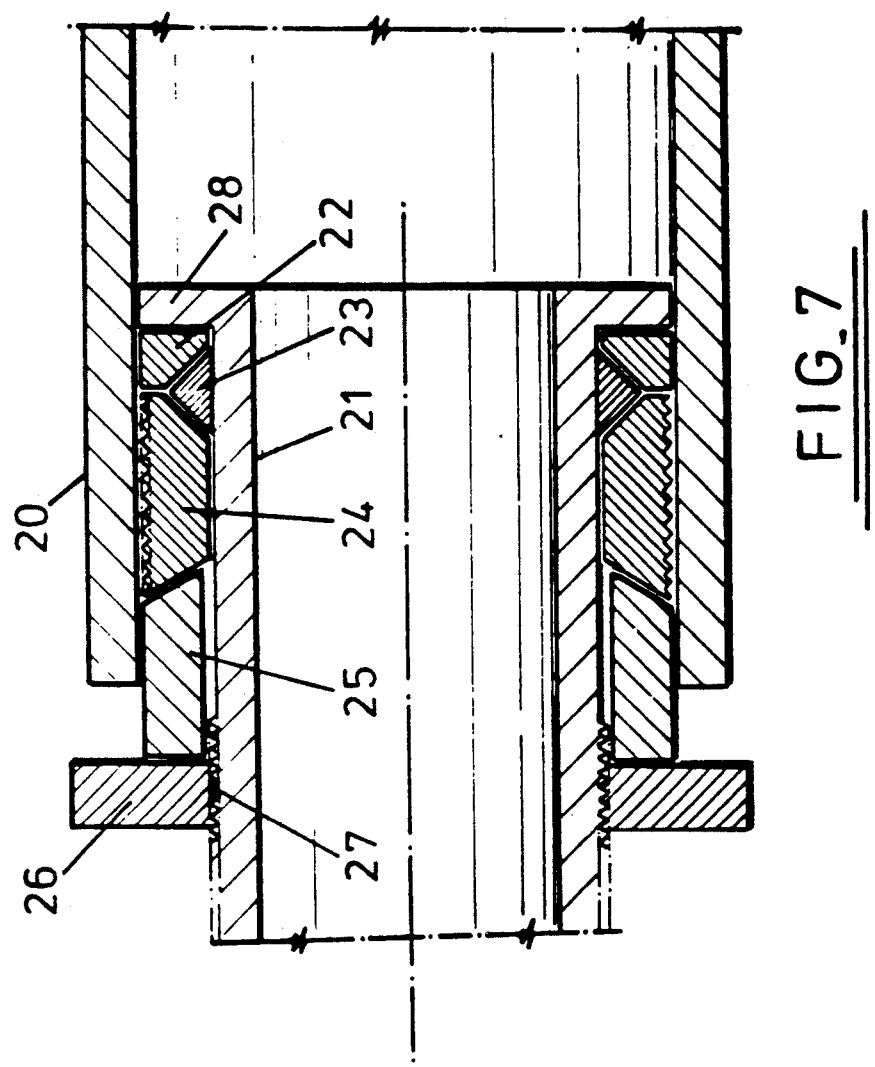
FIG. 7 is a sectional view through a second embodiment of the present invention.

FIG. 7 illustrates an alternative embodiment of the invention suitable for forming a seal with the inner wall of a pipe. In FIG. 7, a pipe 20 receives a tubular fitting body 21 around which are positioned a sealing ring 22, a force transmitting ring 23, segments 24 (which may be identical to those illustrated in FIG. 4), a tubular push ring 25, and a nut 26 engaging a thread 27 provided on the body 21. The nut 26 can be tightened to apply an axial load to the ring assembly, thereby compressing the sealing ring against a shoulder 28 supported in the body 21. The axial load also forces the segments 24 radially outwards to grip the pipe 20.

A significant advantage of the described arrangements is that gripping rings of different nominal diameter can be produced simply by adjusting the number of segments in each gripping ring. Thus a single basic component can be used to form gripping rings suitable for a wide range of nominal pipe diameters. It is of course necessary to provide sealing rings and force transmitting rings matched to the particular pipe size but as these components are fabricated from a single material this can be done relatively cheaply.

Although in the described embodiments the gripping segments are interengaged by dovetails it will be appreciated that alternative means for retaining the gripping elements in position could be provided.

The coupling in accordance with the present invention can be fabricated from any suitable material. For example the gripping segments may be moulded from a hard plastics material such as acetal or fabricated from any appropriate metal. The sealing ring can be fabricated from any suitable elastomeric material. The invention can be used with plastics piping such as polyethylene or any other type of piping such as steel or other metal materials. The force transmitting ring interposed between the sealing and gripping rings may be manufactured from metal or a hard plastics material and may be supplied adhered to the sealing ring. Any appropriate mechanism may be provided for compressing the annular assembly, for example arrangements such as those shown in the accompanying drawings or any other arrangement capable of providing axial and radial compression.

It is important to note that the described arrangements can form effective joints even with distorted pipes of non-circular cross-section. Furthermore, efficient joints can be formed even between components which are axially inclined to each other. The couplings are also capable of resisting pressure fluctuations in which the internal pipe pressure is greater than or less than the external pressure. Furthermore more than one sealing ring and more than one gripping ring can be provided if this is required to meet operating conditions. The couplings are applicable in systems carrying gases, liquids, solids or combinations thereof, and can be supplied to the end user with the ring components ready assembled.

I claim:

1. A pipe coupling for connecting a pipe to a fitting, the coupling comprising an annular assembly incorporating a gripping ring for insertion into a radial gap between the pipe and the fitting, and means for applying an axial load to the annular assembly so that the gripping ring is biased radially against the pipe, wherein the gripping ring is defined by a plurality of segments, adjacent segments of the gripping ring having circumferentially spaced interlocking means for directly and releasably interlocking said segments with each other, said interlocking means providing resistance to separation of any adjacent two of said segments in the gripping ring as a result of tension in the gripping ring, and at least a plurality of said segments being gripping segments which are dimensioned such that when the annular assembly is axially compressed the gripping segments are biased against the pipe.

2. A pipe coupling according to claim 1, wherein adjacent segments in the gripping ring are directly interlocked by dovetail interengaging formations.

3. A pipe coupling according to claim 1, wherein each segment is a said gripping segment.

4. A pipe coupling according to claim 1, wherein at least a plurality of the segments are spacer segments, which annularly space apart and interconnect adjacent gripping segments in the gripping ring.

5. A pipe coupling according to claim 1, wherein the annular assembly includes a resilient sealing ring.

6. A pipe coupling according to claim 5, comprising a force transmitting ring interposed between the gripping ring and the sealing ring.

7. A pipe coupling according to claim 5, wherein the fitting defines a housing into which an end of the pipe is inserted, and the annular assembly extends around the pipe inside the housing.

8. A pipe coupling according to claim 7, wherein the fitting comprises a socket, an annular housing having a first end which is in sliding engagement with the socket and a second end defining a shoulder extending radially inwards and facing towards the first end, the sealing ring is received within the first end of the housing, the gripping ring is located between the sealing ring and the shoulder, and the axial load applying means comprises means forcing the shoulder of the annular housing towards the socket so as to compress the annular assembly between the socket and the said shoulder.

9. A pipe coupling according to claim 8, wherein the fitting comprises a tubular body one end of which is inserted in the end of the pipe, and the annular assembly extends around the tubular body inside the pipe.

10. A pipe coupling according to claim 9, wherein the tubular body has a radially outwardly extending shoulder adjacent its said end, and the axial load applying means comprise means connected to the tubular body for pushing the annular assembly against the said shoulder.

* * * * *